United States Patent
Hayashi

(10) Patent No.: US 8,154,620 B2
(45) Date of Patent: Apr. 10, 2012

(54) IMAGING APPARATUS AND IMAGING METHOD

(75) Inventor: Kenkichi Hayashi, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 397 days.

(21) Appl. No.: 12/562,623

(22) Filed: Sep. 18, 2009

(65) Prior Publication Data

US 2010/0073514 A1 Mar. 25, 2010

(30) Foreign Application Priority Data

Sep. 19, 2008 (JP) ................................ 2008-241092

(51) Int. Cl.
*H04N 5/235* (2006.01)
*H04N 5/222* (2006.01)
*G03B 7/00* (2006.01)

(52) U.S. Cl. ...................... 348/229.1; 348/362; 348/370

(58) Field of Classification Search .................. 348/365, 348/366
See application file for complete search history.

(56) References Cited

U.S. PATENT DOCUMENTS

| | | | |
|---|---|---|---|
| 6,278,490 B1 * | 8/2001 | Fukuda et al. ............... | 348/362 |
| 6,753,920 B1 * | 6/2004 | Momose et al. ............. | 348/371 |
| 6,927,793 B1 * | 8/2005 | Seitz et al. .................. | 348/230.1 |
| 8,022,994 B2 * | 9/2011 | Luo et al. .................... | 348/208.1 |
| 2007/0025717 A1 * | 2/2007 | Raskar et al. ............... | 396/155 |
| 2008/0084486 A1 * | 4/2008 | Enge et al. ................... | 348/239 |
| 2008/0198251 A1 * | 8/2008 | Xu ................................ | 348/297 |
| 2009/0040342 A1 * | 2/2009 | Drimbarean et al. ......... | 348/241 |
| 2009/0268055 A1 * | 10/2009 | Hamilton et al. ........... | 348/230.1 |

FOREIGN PATENT DOCUMENTS

| | | |
|---|---|---|
| JP | 2006-148591 A | 6/2006 |
| JP | 2008-016862 A | 1/2008 |

* cited by examiner

*Primary Examiner* — Albert Cutler
(74) *Attorney, Agent, or Firm* — Birch, Stewart, Kolasch & Birch, LLP

(57) ABSTRACT

An imaging apparatus includes: first and second light receiving elements that photoelectrically convert light, capable of being controlled independently from each other and arranged in a predetermined arrangement; imaging control means, for controlling the first and second light receiving elements; image signal processing means, for obtaining image signals based on the output of the first and/or second light receiving elements and for generating image data; photometry means, for measuring photometric values; imaging condition determining means, for determining imaging conditions including exposure and dynamic range, based on photometry results; judging means, for judging whether flash is to be emitted, based on the photometry results; imaging method selecting means, for selecting a first imaging method when flash is not emitted, and a second imaging method when flash is emitted; and control means, for driving the imaging element and the image signal processing means according to the selected imaging method.

6 Claims, 11 Drawing Sheets

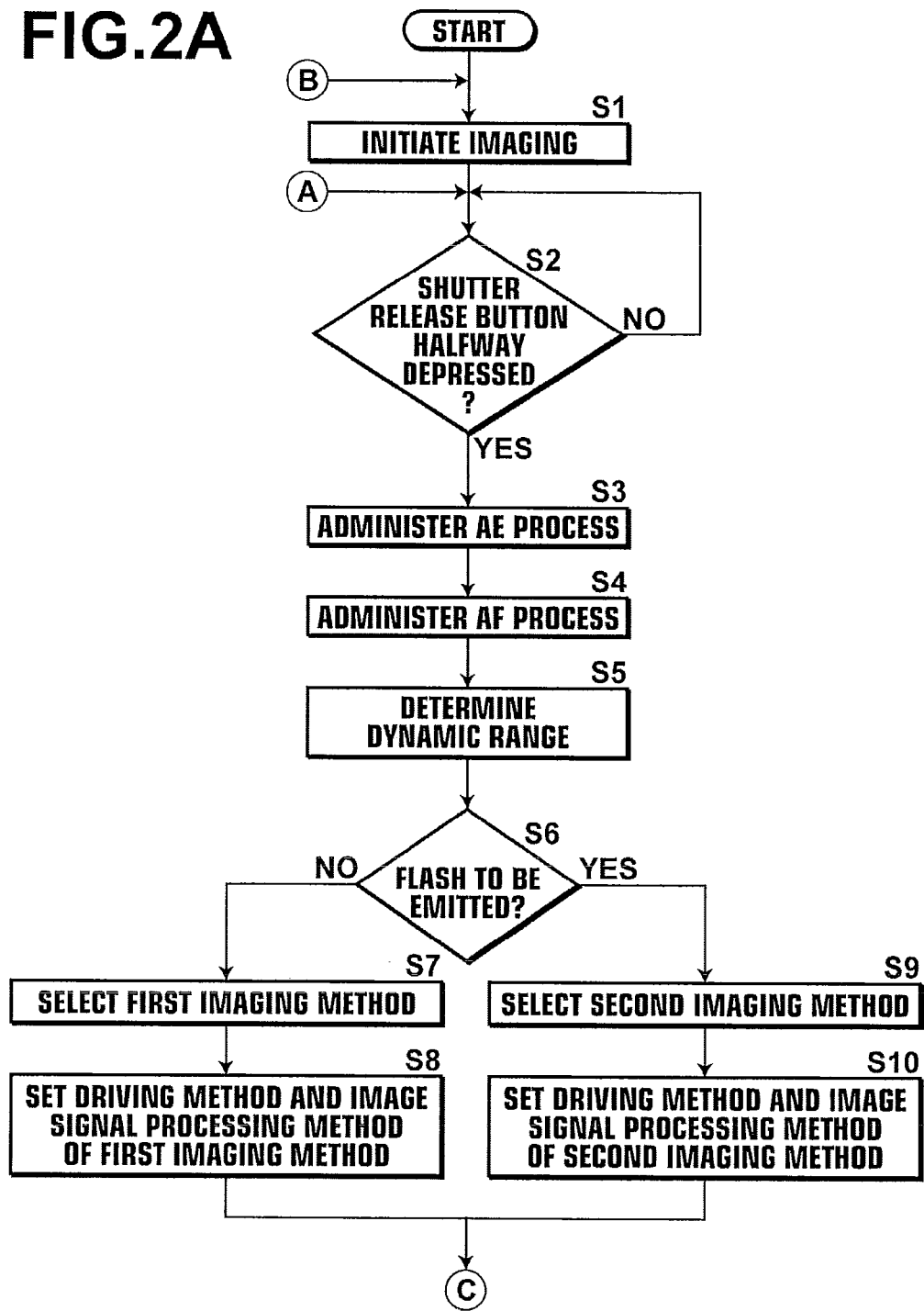

FIG.3A
◆ FIRST METHOD
MAIN PIXELS (STANDARD EXPOSURE)
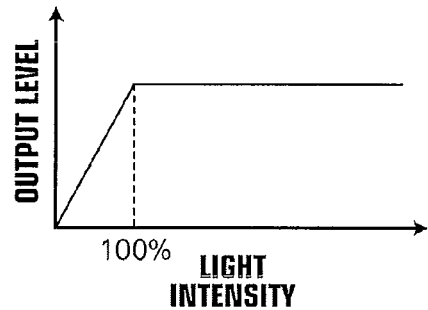 1 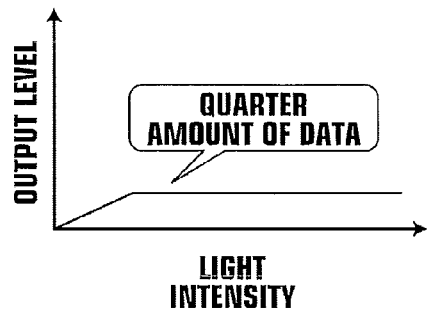
SUB PIXELS (UNDER EXPOSURE)
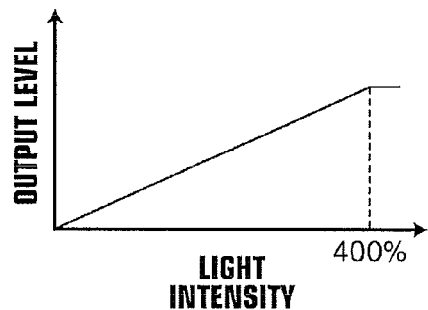 2 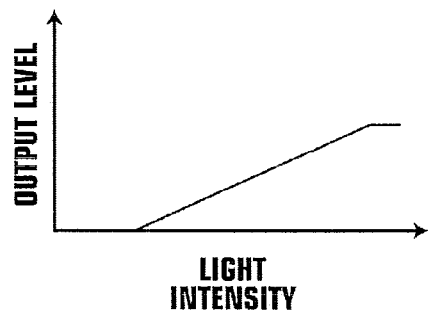
3
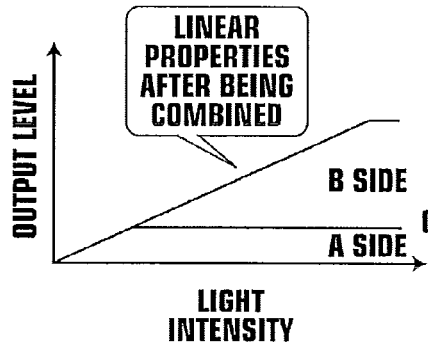 GAMMA CORRECTION 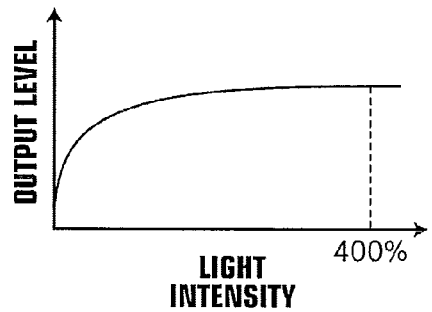

◆ SECOND METHOD

MAIN PIXELS
(UNDER
EXPOSURE)

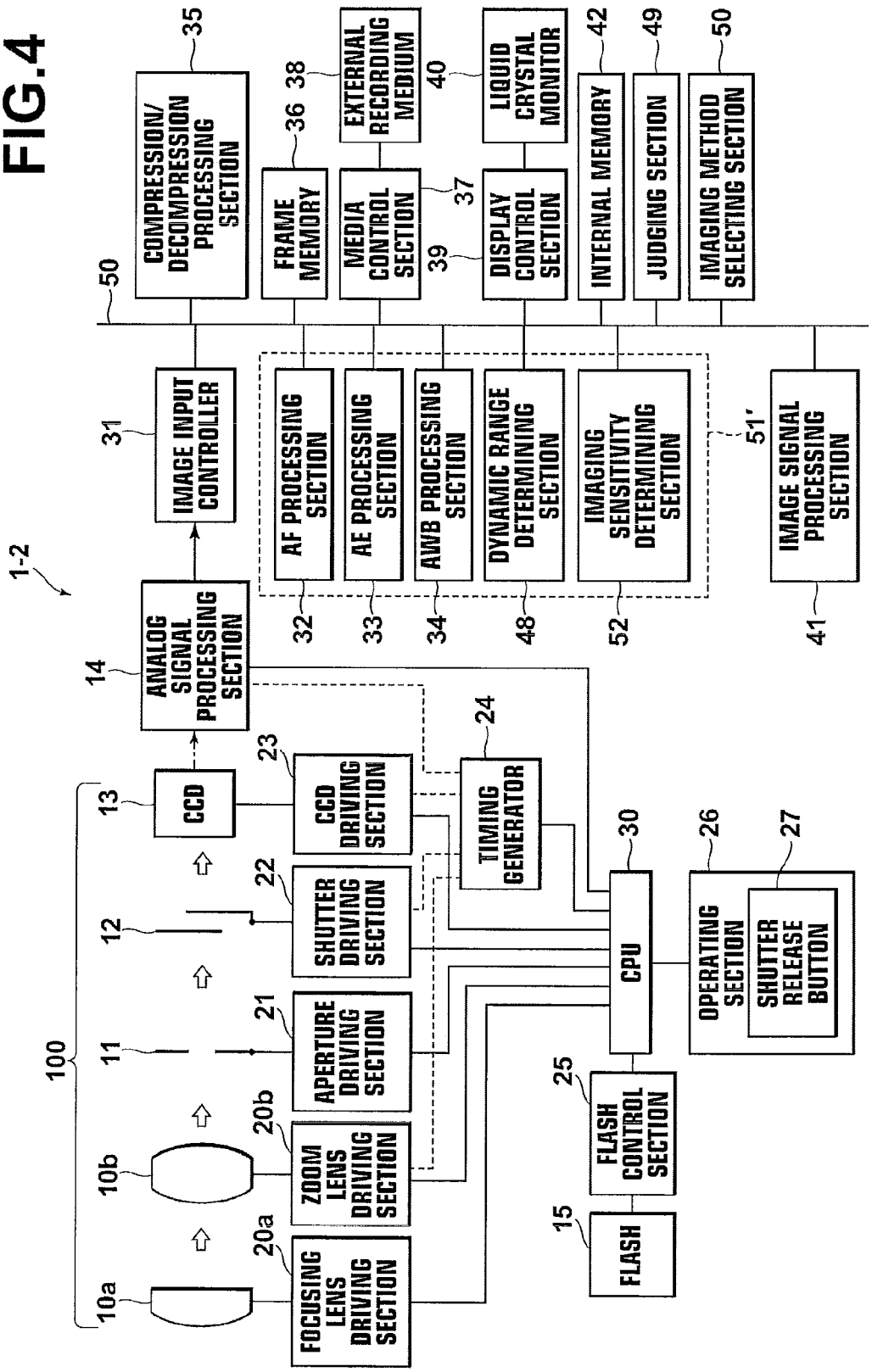

FIG.7
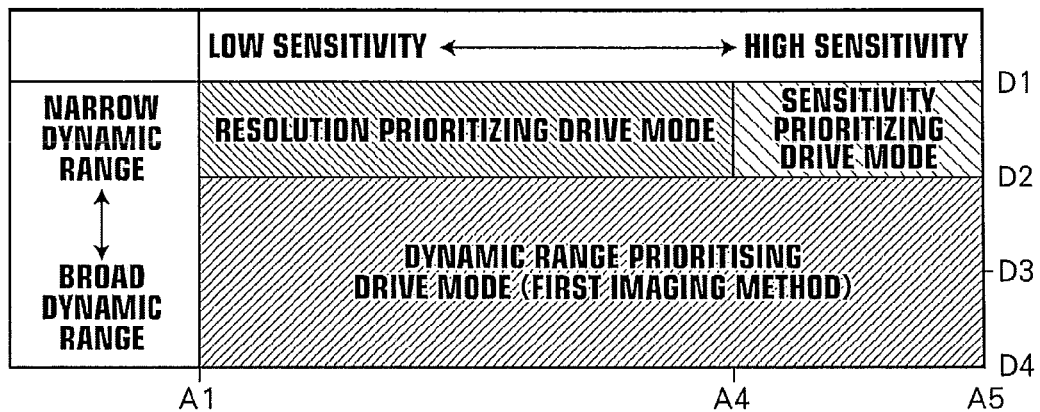
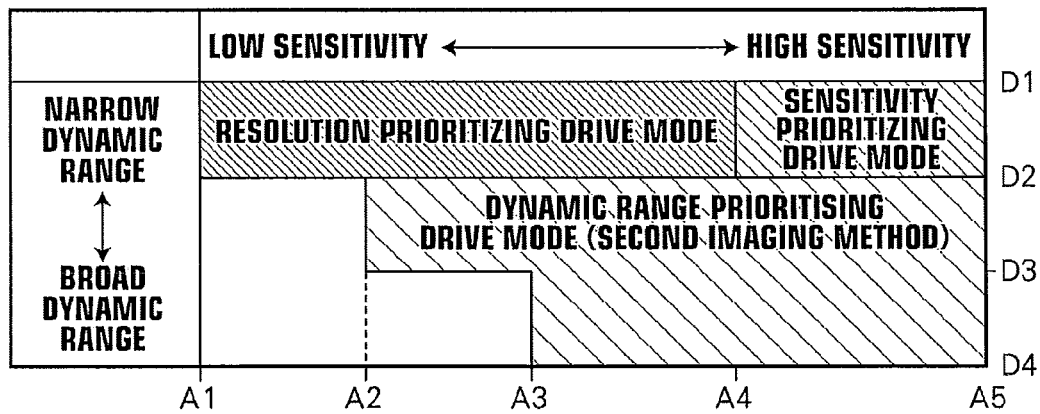

IMAGING APPARATUS AND IMAGING METHOD

BACKGROUND OF THE INVENTION

1. Field of the Invention

The present invention is related to an imaging apparatus such as a digital camera. More specifically, the present invention is related to an imaging apparatus and an imaging method that utilizes an imaging element equipped with two types of light receiving elements, which are capable of being controlled and driven independently from each other.

2. Description of the Related Art

CCD's, which are imaging means employed in digital cameras, have narrower dynamic ranges than silver salt film. Therefore, overexposure and underexposure are likely to occur in images photographed by digital cameras. For this reason, various imaging techniques for obtaining image data sets having expanded dynamic ranges have been proposed. A first example of such an imaging technique is that in which a plurality of image data sets which have been obtained under different exposure conditions are combined (refer to U.S. Pat. No. 6,753,920). A second example of such an imaging technique is that in which a CCD, constituted by an arrangement of main pixels (first light receiving elements) having high sensitivities and sub pixels (second light receiving elements) having smaller areas than the main pixels and therefore lower sensitivities but are less likely to be saturated, is utilized. In this technique, high sensitivity image data obtained by the main pixels and low sensitivity image data obtained by the sub pixels are combined, to obtain a combined image data set that exhibits favorable reproduction properties over a wide range from high brightness to low brightness (refer to Japanese Unexamined Patent Publication No. 2008-016862).

Japanese Unexamined Patent Publication No. 2006-148591 discloses an imaging apparatus that employs the aforementioned second imaging technique, in which the driving method of two types of CCD's are switched according to subject field scenes.

Meanwhile, as an example of a technique for imparting different sensitivity differences among light receiving elements, there is a technique in which the exposure times of light receiving elements are set to be different, in addition to varying the areas of the light receiving elements as described above.

In the electronic camera disclosed in U.S. Pat. No. 6,753,920, imaging may be performed with flash. In this case, the flash is excited during a first imaging operation, and the excited state of the flash is maintained for a second imaging operation, to emit flash based on a set exposure ratio while temporarily ceasing flash emission between the first and second imaging operations. Therefore, it is difficult to control flash emission to accurately realize the set exposure ratio. In addition, because two imaging operations are performed, temporal differences occur in the subject within the two obtained image data sets.

Imaging may also be performed with flash in the imaging apparatuses disclosed in Japanese Unexamined Patent Publication Nos. 2008-016862 and 2006-148591. In this case, when imaging operations are performed such that the exposure time of the main pixels are longer than that of the sub pixels and flash is emitted only during the exposure time of the main pixels, the sub pixels perform imaging operations in a state in which no flash is emitted. Therefore, it is difficult to realize set exposure ratios such as 1:2 and 1:4. In addition, if flash is emitted during the exposure times of both the main pixels and the sub pixels, a difference in the amount of emitted light cannot be obtained between the main pixels and the sub pixels. Therefore, it is not possible to realize the set exposure ratio. Further, it is difficult to realize flash emission at a temporal position that results in a set exposure ratio, due to problems of fluctuations in flash emission times.

SUMMARY OF THE INVENTION

The present invention has been developed in view of the foregoing circumstances. It is an object of the present invention to provide an imaging apparatus and an imaging method that can realize expanded dynamic range even when flash is emitted.

An imaging apparatus of the present invention comprises:

an imaging element constituted by a great number of first light receiving elements and second light receiving elements that photoelectrically convert light from subjects, which are capable of being controlled so as to be driven independently from each other and are arranged in a predetermined arrangement;

imaging control means, for independently controlling the first light receiving elements and the second light receiving elements to drive the imaging element;

image signal processing means, for obtaining image signals based on the output of at least one of the first light receiving elements and the second light receiving elements and for generating image data from the image signals;

photometry means, for measuring the photometric values of the subjects;

imaging condition determining means, for determining imaging conditions including exposure and dynamic range value, based on the results of measurement of the photometric values by the photometry means;

judging means, for judging whether flash is to be emitted toward the subjects, based on the results of measurement of the photometric values by the photometry means;

imaging method selecting means, for selecting a first imaging method, in which the imaging means performs imaging with different exposures for the first light receiving elements and the second light receiving elements and the image signal processing means processes image signals formed based on the outputs of the first light receiving elements and the second light receiving elements that have performed imaging with different exposures to obtain image data in the case that the judging means judges not to emit flash toward the subjects, and a second imaging method, in which the imaging means performs imaging with the first light receiving elements and the second light receiving elements at the same exposure time at an underexposure at a step number based on the determined value of the dynamic range and the image signal processing means administers gradation correcting processes on image signals formed based on the outputs of the first light receiving elements and the second light receiving elements that perform underexposure imaging to obtain image data, in the case that the judging means judges to emit flash toward the subjects; and control means, for driving the imaging element and the image signal processing means according to the imaging method selected by the imaging method selecting means.

Note that in the present invention, examples of the "predetermined arrangement" include: an arrangement in which the first light receiving elements and the second light receiving elements are alternately provided in rows and columns at a constant pitch; a honeycomb arrangement in which the first light receiving elements are provided in odd numbered rows, the second light receiving elements are provided in even numbered rows, and the first light receiving elements of the odd numbered rows and the second light receiving elements of the even numbered rows are shifted by ½ a pitch; and the like.

In the imaging apparatus of the present invention, a configuration may be adopted wherein:

the imaging conditions include the imaging sensitivity of the imaging element;

the imaging method selecting means selects the first imaging method in the case that the judging means judges that flash is not to be emitted and the imaging sensitivity is less than a predetermined threshold value; and the imaging method selecting means selects the second imaging method in the case that the judging means judges that flash is not to be emitted and the imaging sensitivity is greater than or equal to the predetermined threshold value.

Alternatively, a configuration may be adopted wherein:

the imaging conditions include the imaging sensitivity of the imaging element;

the imaging method selecting means selects a drive pattern from between: a first matrix drive pattern that includes the first imaging method that prioritizes dynamic range, an imaging method that prioritizes resolution, an imaging method that prioritizes resolution, and an imaging method that prioritizes sensitivity, each of which is set in advance for each imaging sensitivity value and each dynamic range value; and a second matrix drive pattern that includes the second imaging method that prioritizes dynamic range, an imaging method that prioritizes resolution, and an imaging method that prioritizes sensitivity, each of which is set in advance for each imaging sensitivity value and each dynamic range value;

the imaging method selecting means selects the first matrix drive pattern when the judging means judges that flash is not to be emitted and selects the second matrix drive pattern when the judging means judges that flash is to be emitted, and then selects an imaging method from among the plurality of imaging methods which are included in the selected matrix drive pattern, based on the imaging sensitivity and the dynamic range value determined by the imaging condition determining means.

An imaging method of the present invention is an imaging method that utilizes an imaging apparatus equipped with an imaging element constituted by a great number of first light receiving elements and second light receiving elements that photoelectrically convert light from subjects, which are capable of being controlled so as to be driven independently from each other and are arranged in a predetermined arrangement, comprising the steps of:

measuring the photometric values of the subjects;

determining imaging conditions including exposure and dynamic range value, based on the results of measurement of the photometric values;

judging whether flash is to be emitted toward the subjects, based on the results of measurement of the photometric values by the photometry means;

selecting a first imaging method, in which the imaging means performs imaging with different exposures for the first light receiving elements and the second light receiving elements and the image signal processing means processes image signals formed based on the outputs of the first light receiving elements and the second light receiving elements that have performed imaging with different exposures to obtain image data in the case that the judging means judges not to emit flash toward the subjects;

selecting a second imaging method, in which the imaging means performs imaging with the first light receiving elements and the second light receiving elements at the same exposure time at an underexposure at a step number based on the determined value of the dynamic range and the image signal processing means administers gradation correcting processes on image signals formed based on the outputs of the first light receiving elements and the second light receiving elements that perform underexposure imaging to obtain image data, in the case that the judging means judges to emit flash toward the subjects; and driving the imaging element and processing image signals according to the imaging method selected by the imaging method selecting means.

In the imaging method of the present invention, a configuration may be adopted wherein:

the imaging conditions include the imaging sensitivity of the imaging element;

the first imaging method is selected in the case that the judging means judges that flash is not to be emitted and the imaging sensitivity is less than a predetermined threshold value; and the second imaging method is selected in the case that the judging means judges that flash is not to be emitted and the imaging sensitivity is greater than or equal to the predetermined threshold value.

Alternatively, a configuration may be adopted wherein:

the imaging conditions include the imaging sensitivity of the imaging element;

a first matrix drive pattern that includes the first imaging method that prioritizes dynamic range, an imaging method that prioritizes resolution, an imaging method that prioritizes resolution, and an imaging method that prioritizes sensitivity; and a second matrix drive pattern that includes the second imaging method that prioritizes dynamic range, an imaging method that prioritizes resolution, and an imaging method that prioritizes sensitivity; are set in advance for each imaging sensitivity value and each dynamic range value;

the first matrix drive pattern is selected when the judging means judges that flash is not to be emitted and the second matrix drive pattern is selected when the judging means judges that flash is to be emitted; and an imaging method is selected from among the plurality of imaging methods which are included in the selected matrix drive pattern, based on the determined imaging sensitivity and the dynamic range value.

According to the imaging apparatus and the imaging method of the present invention, an imaging apparatus equipped with an imaging element constituted by a great number of first light receiving elements and second light receiving elements that photoelectrically convert light from subjects, which are capable of being controlled so as to be driven independently from each other and are arranged in a predetermined arrangement is utilized. A first imaging method, in which the imaging means performs imaging with different exposures for the first light receiving elements and the second light receiving elements to realize a expanded dynamic range is selected in the case that the judging means judges not to emit flash toward the subjects, and a second imaging method, in which the imaging means performs imaging with the first light receiving elements and the second light receiving elements at the same exposure time to realize a expanded dynamic range is selected in the case that the judging means judges to emit flash toward the subjects. Therefore, if the first imaging method is employed when flash is emitted, it is difficult to set an accurate exposure ratio between the first light receiving elements and the second light receiving elements. However, the second imaging method that obviates the setting of different exposure amounts between the first light receiving elements and the second light receiving elements is utilized when flash is to be emitted. Therefore, an expanded dynamic range can be realized even when flash is emitted.

Accordingly, when photography is performed according to a dynamic range prioritizing imaging method, the limitations of dynamic range expansion functions can be reduced.

BRIEF DESCRIPTION OF THE DRAWINGS

FIG. 2A is a first flow chart that illustrates the steps of an imaging process executed by the digital camera of the first embodiment.

FIG. 3A is a set of diagrams for explaining an image process which is employed in a first imaging method.

FIG. 4 is a block diagram that illustrates the functional construction of a digital camera according to a second embodiment of the present invention.

FIG. 7 illustrates examples of matrix drive patterns.

DESCRIPTION OF THE PREFERRED EMBODIMENTS

Hereinafter, an imaging apparatus according to an embodiment of the present invention will be described in detail with reference to the attached drawings. Note that in the following embodiment, a digital camera 1 will be described as the imaging apparatus of the present invention. However, the present invention is not limited to being applied to digital cameras, and may be applied to various types of electronic devices, such as a cellular telephone with built in camera, a PDA with built in camera, and other devices equipped with electronic imaging functions.

Figure 1:
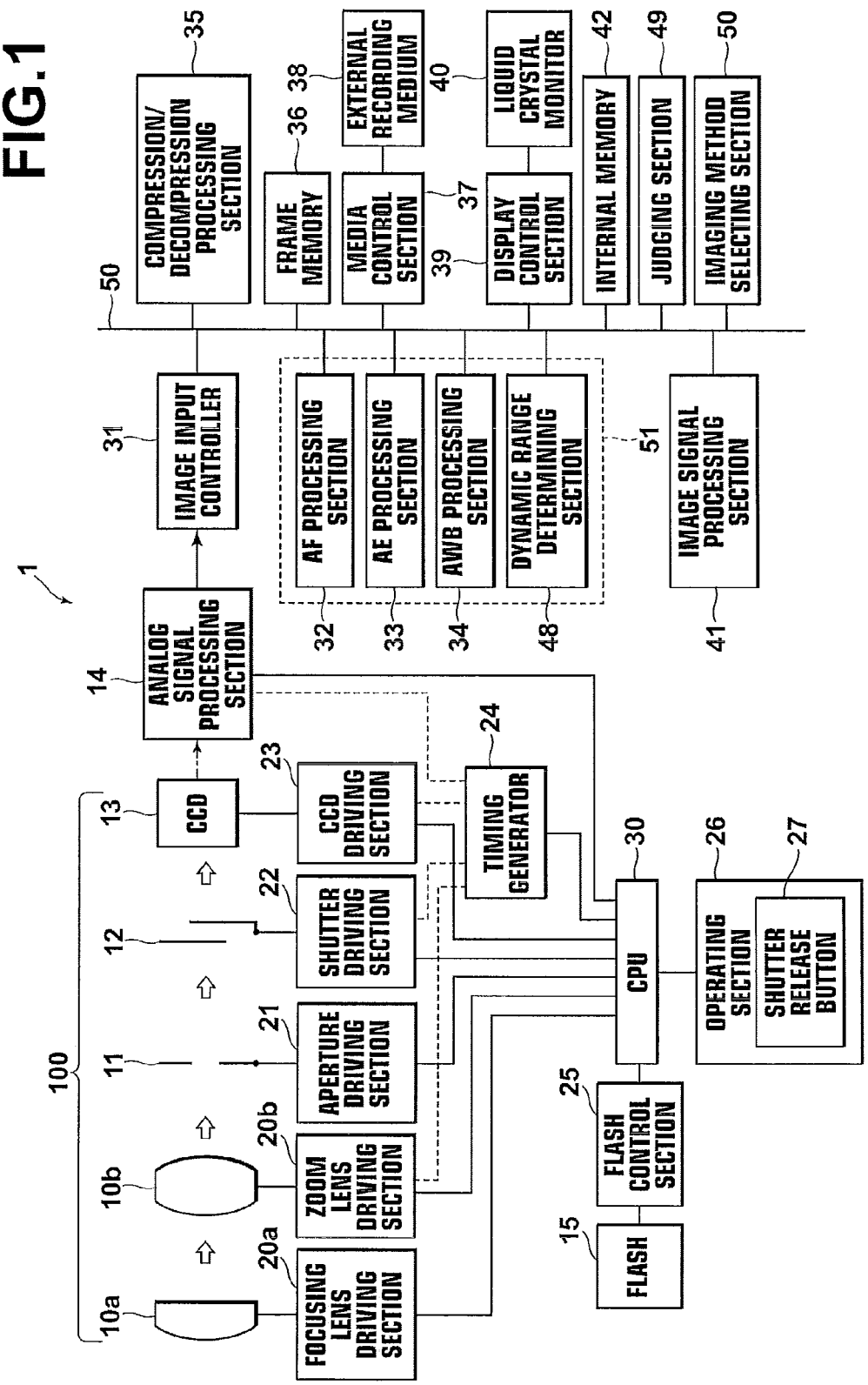
FIG. 1 is a block diagram that illustrates the functional construction of a digital camera according to a first embodiment of the present invention.

FIG. 1 is a block diagram that illustrates the functional construction of the digital camera 1. As illustrated in FIG. 1, the digital camera of the present embodiment is equipped with an operating section 26 that transmits the operations of a shutter release button 27, a menu/OK button (not shown), a zoom/up and down arrow buttons (not shown) and the like to a CPU 30.

Imaging lenses 10 focus images of subjects onto a predetermined image focusing surface (a CCD provided in the interior of the main body of the camera). The imaging lenses 100 are constituted by a focusing lens 10a and a zoom lens 10b. Each of the focusing lens 10a and the zoom lens 10b are driven in a stepwise manner by a focus lens driving section 20a and a zoom lens driving section 20b, which are respectively constituted by a motor and a motor driver, so as to be movable in the direction of the optical axes thereof. The focusing lens driving section 20a drives the focusing lens 10a in a stepwise manner based on focus driving amount data output from an AF processing section 32 to be described later. The zoom lens driving section 20b controls the stepwise driving of the zoom lens 10b based on operation amount data from the zoom/up and down arrow buttons (of the operating section 26).

An aperture 11 is driven by an aperture driving section 21 constituted by a motor and a motor driver. The aperture driving section 21 adjusts how much the aperture 11 is opened based on aperture value data output from an AE processing section 33 to be described later.

A shutter 12 is a mechanical shutter, and is driven by a shutter driving section 22 constituted by a motor and a motor driver. The shutter driving section 22 controls the opening and closing of the shutter 12 according to a signal which is generated when the shutter release button 27 is released, and also according to shutter speed data output from the AE processing section 33.

A CCD 13 (imaging element) is provided toward the rear of the optical system described above. The CCD 13 has a photoelectric converting surface, in which a plurality of first light receiving elements and a plurality of second light receiving elements which are capable of being controlled and driven independent from each other and have the same area are arranged in a honeycomb arrangement. The honeycomb arrangement refers to an arrangement in which the first light receiving elements are provided in odd numbered rows, the second light receiving elements are provided in even numbered rows, and the first light receiving elements of the odd numbered rows and the second light receiving elements of the even numbered rows are shifted by ½ a pitch. Light from subjects which has passed through the optical system is focused onto the photoelectric converting surface, and photoelectrically converted. A microlens array (not shown) for focusing light onto each pixel, and a color filter array, in which R, G, and B filters are arranged in a regular manner, are provided in front of the photoelectric converting surface.

The CCD 13 outputs serial analog image signals by reading out electric charges which are accumulated in each pixel one line at a time, synchronized with vertical transfer clock signals and horizontal transfer clock signals provided by a CCD driving section 23 (imaging control means). The amounts of time that charges are accumulated at the pixels corresponding to each of the first light receiving elements and the second light receiving elements, that is, exposure times, are determined by electronic shutter driving signals provided separately for the first light receiving elements and the second light receiving elements by the CCD driving section 23.

The analog image signals output by the CCD 13 are input into an analog signal processing section 14. The analog signal processing section 14 is constituted by: a correlated double sampling (CDS) circuit for removing noise from the analog image signals; an automatic gain controller (AGC) for adjusting the gain for the analog image signals; and an A/D converter (ADC) for converting the analog image signals to digital image data. The digital image data that the analog image signals are converted into are CCD-RAW data having RGB density values for each pixel.

A timing generator 24 generates timing signals. The timing signals are input to the shutter driving section 22, the CD driving section 23, and the analog signal processing section 14, to synchronize the operation of the shutter release button 27, the opening and closing of the shutter 12, the charge accumulation at the CCD 13, and the processing by the analog signal processing section 14.

A flash 15 instantaneously emits light necessary for photography toward subjects while the shutter 12 is open by the shutter release button 27 being depressed. A flash control section 25 controls the light emitting operation of the flash 15, based on judgments made by a judging section 49 to be described later.

An image input controller 31 writes the CCD-RAW data input from the analog signal processing section 14 in a frame memory 36. The frame memory 36 is a memory used as workspace for various types of digital image processes (signal processing) on the image data, which will be described later, and comprises an SDRAM (Synchronous Dynamic Random Access Memory) that carries out data transfer in synchronization with a bus clock signal of a predetermined period, for example.

A display control section 39 is used to display the image data stored in the frame memory 36 as a through the lens image on a liquid crystal monitor 40. The display control section 39 converts luminance (Y) signals and color (C) signals into unified composite signals, and outputs the composite signals to the liquid crystal monitor 40. The through the lens image is obtained at predetermined intervals and displayed on the liquid crystal monitor 40 when the photography mode is selected. In addition, the display control section 39 displays images based on image data included in image files which are stored in external recording media 38 and read out by a media control section 37 on the liquid crystal monitor 40.

The AF processing section 32 detects a focusing position based on image data, determines a focus setting value (focusing drive amount), and outputs focusing drive amount data. A passive method, in which a characteristic that a focus evaluation value (contrast value) of images increases in a focused state is utilized, may be applied to detect the focusing position. Alternatively, an active method, in which distances to subjects are detected by a distance measuring sensor and the measurement results are utilized, may be employed.

The AE processing section 33 (photometry means) measures the luminance of subjects (photometric value) based on image data, and determines exposure conditions such as an aperture value, an exposure time (shutter speed) and the like, based on the luminance. The AE processing section 33 then outputs aperture value data and exposure time data (AE processing). Generally, if the exposure time is set to be long, the shutter speed becomes slow and blurring due to shaky hands becomes likely to occur. On the other hand, if the exposure time is set to be short, the shutter speed becomes hast and blurring due to shaky hands becomes less likely to occur. If the exposure time is excessively long, overexposure occurs, resulting in obtained photographs becoming whitish. If the exposure time is excessively short, underexposure occurs, resulting in obtained photographs becoming dark.

An AWB processing section 34 calculates color temperature based on image data, and automatically adjusts white balance (AWB processing) during actual imaging according to the calculated color temperature. Note that the AWB processing section 34 may adjust white balance prior to imaging or following imaging.

A dynamic range determining section 48 determines dynamic range values from the brightness of a subject as a whole or a difference between a central portion and the periphery, for example, based on the photometric value data detected by the AE processing section 33, and set exposure values such as aperture value and exposure time (shutter speed).

The AF processing section 32, the AE processing section 33, the AWB processing section 34 and the dynamic range determining section 48 function as an imaging condition determining section 51 (imaging condition determining means) that determines imaging conditions based on photometric results.

A judging section 49 judges whether flash is to be emitted toward subjects, based on the photometric results of the subject obtained by the AE processing means 33. Note that the CPU 30 may function as the judging section 49.

An imaging method selecting section 50 selects either a first imaging method or a second imaging method, based on the results of judgment by the judging means 49. Note that the first imaging method and the second imaging method will be described in detail later.

An image signal processing section 41 (image signal processing means) administers different signal processes onto the image signals input from the image input controller according to the imaging method selected by the imaging method selecting section 50. Note that the processing methods will be described in detail later. In addition, the image signal processing section 41 administers image quality enhancement processes such as Gamma correction, sharpness correction, and contrast correction on image data of final images. Further, the image signal processing section 41 also administers YC processes to convert the CCD-RAW data into YC data comprising Y data as a luminance signal, Cb data as a blue color difference signal, and Cr data as a red color difference signal.

Note that the final image is an image based on the image data stored in the frame memory 36 via the analog signal processing section 14 and the image input controller 31 after input of the analog image data from the CCD 13, in response to a full depression of the shutter release button 27. The maximum number of pixels of the final image is determined by the number of the pixels of the CCD 13. However, the number of pixels to be recorded can be changed by the user, by setting the image quality to possible settings (such as full pixels, half pixels, and automatic selection of pixel numbers). The number of pixels of the through the lens image may be less than that of the final image, and may be $\frac{1}{16}$ that of the final image, for example.

A compression/decompression section 35 carries out compression processes to a format such as JPEG on the image data, which has been subjected to the image enhancement processes and the like by the image signal processing section 41, and generates an image file. Accompanying information, such as photography date/time and whether the image has been photographed in a portrait right protecting mode, is added as tags to the image file, based on the Exif format. The compression/decompression section 35 also reads compressed images files from the external recording media 38 in the playback mode, and administers decompression processes thereon. Image data, on which the decompression processes have been administered, are output to the display control section 39, and displayed on the liquid crystal monitor 40.

The media control section 37 is equipped with a media slot into which the external recording media 38 are loaded. When an external recording medium 38 is loaded into the media slot, data is read out from and written into the external recording medium 38. The media control section 37 carries out image-file reading and writing from and to the external recording media 38.

An internal memory 42 has various constants which are set within the digital camera 1 and programs to be executed by the CPU 30 stored therein.

The CPU 30 controls the components of the digital camera 1 according to operations of the operating section 26 and signals from each of the functional blocks. The CPU 30 also functions as a control means for driving the CCD 13 via the CCD driving section 23 and for driving the image signal processing section 41 according to the imaging method which is selected by the imaging method selecting section 50.

A data bus 50 is connected to the image input controller 31, the various processing sections 14, 32 through 35 and 41, the frame memory 36, the control sections 25, 37, and 39, the face detecting section 43, the internal memory 42, the scene discriminating section 44, the determining sections 45 through 47 and the CPU 30. Various signals and data are transmitted through the data bus 50.

Figure 2B:
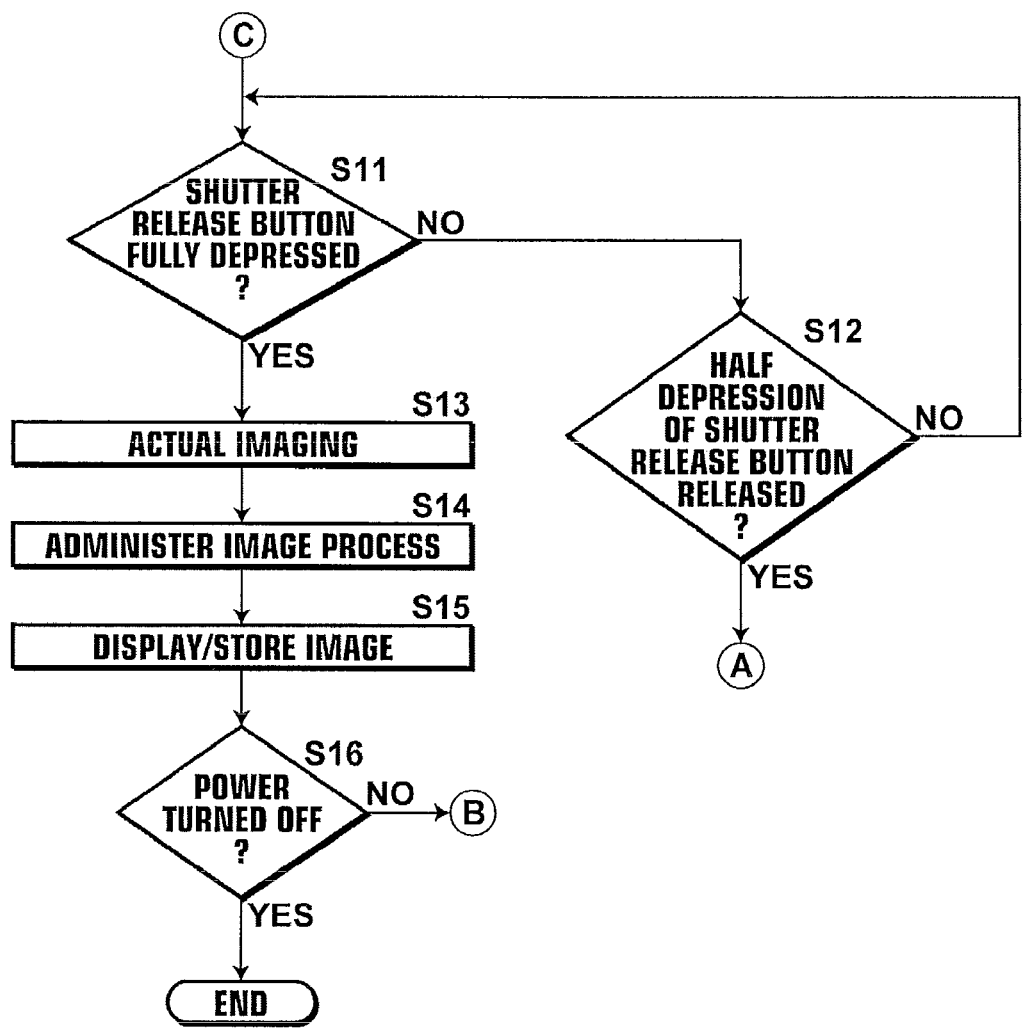
FIG. 2B is a second flow chart that illustrate the steps of an imaging process executed by the digital camera of the first embodiment.

Next, imaging which is performed by the digital camera 1 having the configuration described above will be described. FIG. 2A and FIG. 2B are flow charts that illustrate the steps of an imaging process executed by the digital camera 1. As illustrated in FIG. 2A, when power is supplied and the digital camera 1 is turned ON, imaging of a subject is initiated (step S1) and the display control section 39 performs control of display of through the lens images. Display of the through the lens images is a process in which image data stored in the frame memory 36 is displayed on the liquid crystal monitor 40.

Next, the CPU 30 judges whether the shutter release button 27 has been depressed halfway (step S2). In the case that the shutter release button 27 is not depressed halfway (step S2: NO), the CPU 30 repeats the process of step S2 until the shutter release button 27 is depressed halfway. In the case that the shutter release buttons 27 is depressed halfway (step S2: YES), the AE processing section 33 performs an AE process (step S3), and the AF processing section 34 performs an AF process (step S4). At this time, the AWB processing section 34 may also perform an AWB process.

Next, the dynamic range determining section 48 determines the dynamic range value as described above (step S5).

Then, the judging section 49 judges whether flash is to be emitted, based on the photometric results of the subject obtained by the AE processing section 33 (step S6). In the case that the judging section 49 judges that flash is not to be emitted (step S6: NO), the imaging method selecting section 50 selects the first imaging method (step S7). Here, the first imaging method will be described.

In the first imaging method, the CCD driving section 23 drives the CCD 13 such that the exposure times of the first light receiving elements and the second light receiving elements are different. The image signal processing section 41 is driven such that it does not combine the outputs of the main pixels corresponding to the first light receiving elements and the sub pixels corresponding to the second light receiving element. Instead, the image signal processing section 41 treats the outputs of each of the first light receiving elements and the second light receiving elements as a single pixel. The image signals having different output levels are processed and combined to generate an image data set in which the dynamic range is expanded.

FIG. 3A is a diagram for explaining a first image signal processing method which may be employed in the dynamic range prioritizing drive mode. For example, in the case that the dynamic range is to be expanded by four times, the exposure amount of the main pixels is set to a standard exposure amount, while the exposure amount of the sub pixels is set to ¼ the standard exposure amount, as illustrated in FIG. 3A. That is, the sub pixels perform imaging at underexposure. Thereby, output properties are obtained wherein the outputs of the main pixels become saturated at an exposure amount of 100%, while the outputs of the sub pixels become saturated at an exposure amount of 400%. Therefore, image data for obtaining low brightness data are obtained from the main pixels (A side), and image data for obtaining high brightness data are obtained from the sub pixels (B side). Then the outputs of the main pixels and the sub pixels are combined.

When combining the outputs of the main pixels and the sub pixels, first, the amount of data output from the main pixels is reduced to ¼ as illustrated in the right side of FIG. 3A1, to cause the inclination properties of the outputs of the main pixels and the outputs of the sub pixels to match. Then, the portion of the output of the sub pixels (the left side of FIG. 3A2) corresponding to the quartered output of the main pixels is subtracted from the output of the sub pixels. Next, the output of the sub pixels from which the portion has been subtracted (the right side of FIG. 3A2) is added to the quartered output of the main pixels (the right side of FIG. 3A1), to generate a single combined image data set, as illustrated in FIG. 3A3. Gamma correction is administered onto the combined image data set to restore an appropriate brightness, to generate an image data set in which the dynamic range has been expanded four times.

If the imaging method selecting means 50 selects the first imaging method (step S7) as described above, next, the CPU 30 that functions as a control means sets the driving method of the CCD 13 according to the first imaging method at the CCD driving section 23, the timing generator, and the analog signal processing section 14, that is, the AFE (Analog Front End), and sets the image signal processing method according to the first imaging method at the image signal processing section 41 (step S8).

On the other hand, in the case that the judging section 49 judges that flash is to be emitted at step S6 (step S6: YES), the imaging method selecting section 50 selects the second imaging method (step S9). Here, the second imaging method will be described.

In the second imaging method, the CCD driving section 23 drives the CCD 13 such that the exposure times of the first light receiving elements and the second light receiving elements are equal, and such that imaging is performed with an underexposure at a step number corresponding to the dynamic range. The image signal processing section 41 is driven such that gamma correcting processes are administered onto the obtained image data to restore the brightness of the image, to generate an image data set in which the dynamic range has been expanded.

Figure 3B:
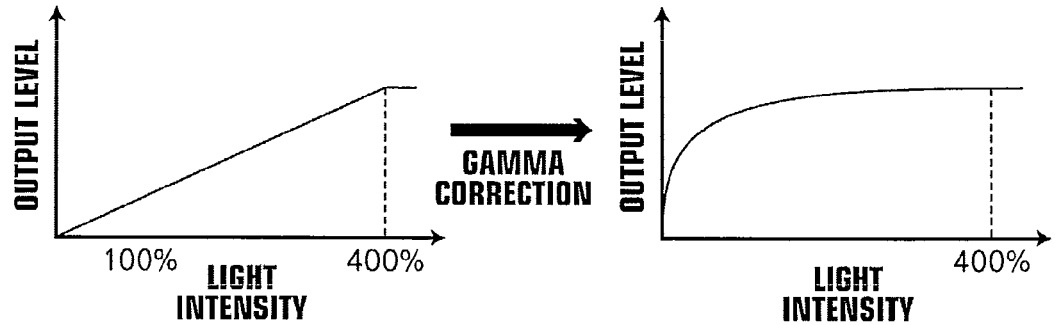
FIG. 3B is a diagram for explaining an image process which is employed in a second imaging method.

FIG. 3B is a diagram for explaining the image signal processing method of the second imaging method. For example, in the case that the dynamic range is to be expanded by four times, the exposure amounts of the main pixels and the sub pixels are set to ¼ a standard exposure amount, as illustrated in FIG. 3B. That is, the main pixels and the sub pixels perform imaging at underexposure. By performing imaging at underexposure, output properties are obtained wherein the outputs of the main pixels and the sub pixels become saturated at an exposure amount of 400%, as opposed to becoming saturated at an exposure amount of 100% in the case that imaging is performed at the standard exposure. Then, gamma correction is administered onto the image data set obtained by underexposure to restore an appropriate brightness, to generate an image data set in which the dynamic range has been expanded four times.

Note that at this time, the outputs from the two types of pixels may be read out as combined outputs, or the outputs from the two types of pixels may be combined after being read out, to generate an image data set having half the number of pixels. In the second imaging method, the same effects as those obtained by increasing gain (increased noise) are obtained by administering the gamma correction process. That is, the gamma correction process is equivalent to increasing gain. Therefore, dynamic range cannot be expanded by gamma correction in cases that imaging is performed with low sensitivity.

If the imaging method selecting means 50 selects the second imaging method (step S9) as described above, next, the CPU 30 that functions as a control means sets the driving method of the CCD 13 according to the second imaging method at the CCD driving section 23, the timing generator, and the analog signal processing section 14, that is, the AFE (Analog Front End), and sets the image signal processing method according to the second imaging method at the image signal processing section 41 (step S10).

Next, as illustrated in FIG. 2B, the CPU 30 judges whether the shutter release button 27 has been fully depressed (step S11). In the case that the shutter release button 27 is not fully depressed (step S11: NO), the CPU 30 judges whether the half depression of the shutter release button 27 has been released (step S12). In the case that the half depression of the shutter release button 27 has been released (step S12: YES), the process returns to step S2. In the case that the half depression of the shutter release button 27 has not been released (step S12: NO), the process returns to step S11, and steps S11 and S12 of the process are repeated.

On the other hand, in the case that it is judged that the shutter release button 27 has been fully depressed in step S11 (step S11: YES), the CPU 30 causes the focusing lens driving section 20a, the aperture driving section 21, and the shutter driving section 22 to drive the focusing lens 10a, the aperture 11, and the shutter 12 according to the focus driving amount data determined by the AF processing section 32 and the exposure values set by the AE processing section, and causes the CCD driving section 23 to drive the CCD 13 according to the drive mode determined by the drive mode determining section 47, to perform actual imaging (step S13). Thereafter, the CPU 30 causes the image signal processing section 41 to administer image processes on the final image which has been obtained by the actual imaging, according to the imaging method selected by the imaging method selecting section 50 (step S14).

Next, the final image, onto which image processes have been administered by the image signal processing section 41, is displayed on the liquid crystal monitor 40 via the display control section 39, and recorded in the external recording medium 38 via the media control section 37 (step S15). Note that at this time, an image file may be generated by the compression/decompression processing section 35 administering a compression process onto the final image data, on which the image processes have been administered.

Then, the CPU 30 judges whether power has been turned OFF (step S16). In the case that the result of judgment at step S16 is negative (step S16: NO), the process returns to step S1, and the steps following thereafter are repeated. In the case that power has been turned OFF (step S16: YES), the power supply to the digital camera 1 is turned OFF, and the process ends. The digital camera 1 performs imaging processes in the manner described above.

According to the digital camera 1 of the present embodiment and the imaging method employed by the digital camera 1, a first imaging method, in which the imaging means performs imaging with different exposures for the first light receiving elements and the second light receiving elements to realize a expanded dynamic range is selected in the case flash is not emitted toward the subjects, and a second imaging method, in which the imaging means performs imaging with the first light receiving elements and the second light receiving elements at the same exposure time to realize a expanded dynamic range is selected in the case that flash is emitted toward the subjects. Therefore, if the first imaging method is employed when flash is emitted, it is difficult to set an accurate exposure ratio between the first light receiving elements and the second light receiving elements. However, the second imaging method that obviates the setting of different exposure amounts between the first light receiving elements and the second light receiving elements is utilized when flash is to be emitted. Therefore, an expanded dynamic range can be realized even when flash is emitted.

Accordingly, when photography is performed according to a dynamic range prioritizing imaging method, the limitations of dynamic range expansion functions can be reduced.

Next, a digital camera 1-2 according to a second embodiment of the present invention will be described in detail with reference to the following drawings. FIG. 4 is a block diagram that illustrates the functional construction of the digital camera 1-2. Because the configuration of the digital camera 1-2 of the second embodiment is substantially the same as that of the digital camera 1 of the embodiment described above, the components thereof which are the same as those of the digital camera 1 are denoted with the same reference numerals, and detailed descriptions thereof will be omitted. Detailed descriptions will be given only with regard to the components of the digital camera 1-2 that differ from those of the digital camera 1.

As illustrated in FIG. 4, an imaging condition determining section 51' of the digital camera 1-2 of the second embodiment differs from the imaging condition determining section 51 of the digital camera 1 of FIG. 1. The imaging condition determining section 51' of the second embodiment is equipped with an imaging sensitivity determining section 52. The imaging sensitivity determining section 52 determines imaging sensitivities based on photometric data obtained by the AE processing means 33 and set exposure values, such as aperture values and exposure times (shutter speeds). Note that the imaging sensitivity may be set as desired by a user operating the operating section 26. In this case, the imaging sensitivity determining section 52 reads out the value of the imaging sensitivity which has been set by the operating section 26 via the CPU 30, and determines the read out value as the imaging sensitivity.

Figure 5A:
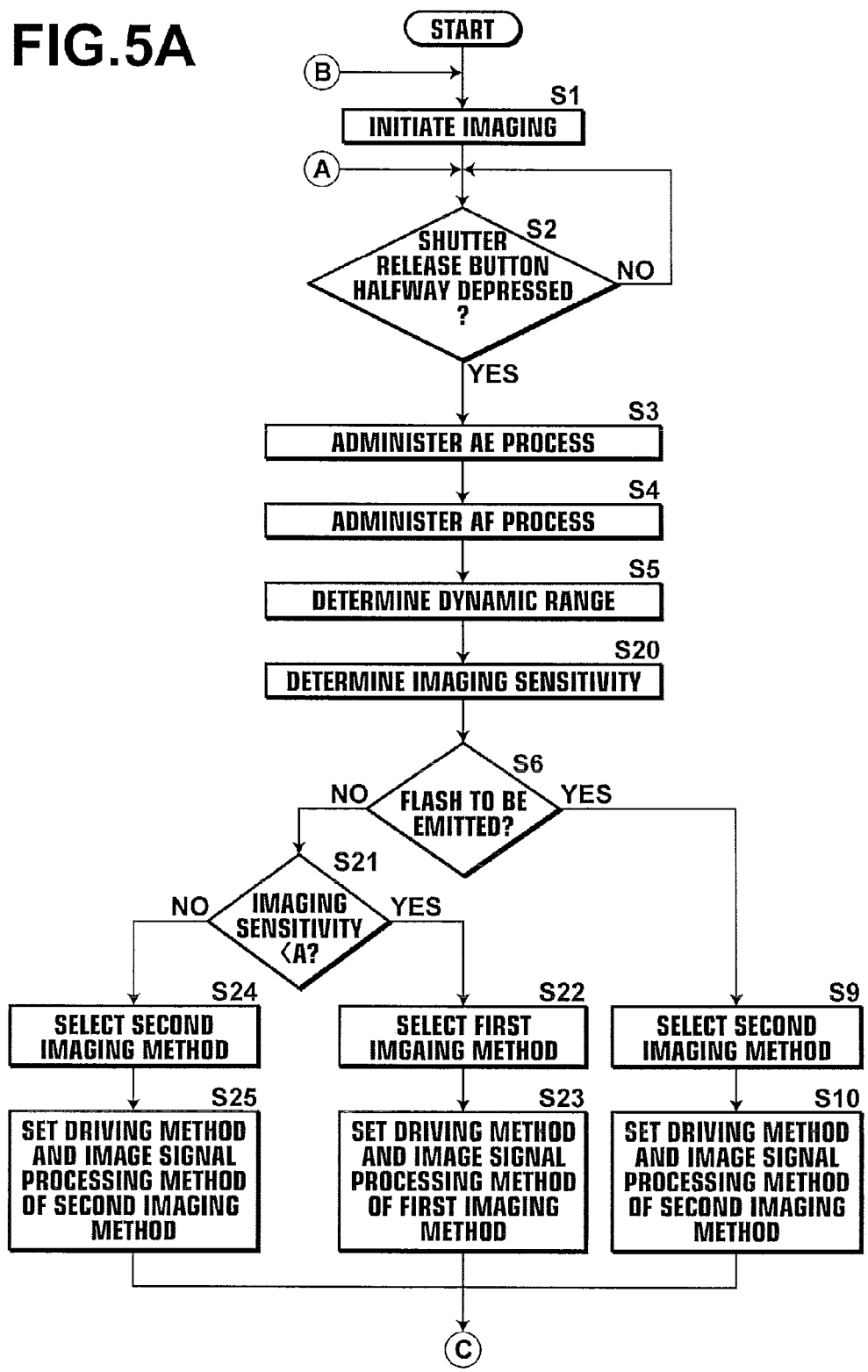
FIG. 5A is a first flow chart that illustrates the steps of an imaging process executed by the digital camera of the second embodiment.
Figure 5B:
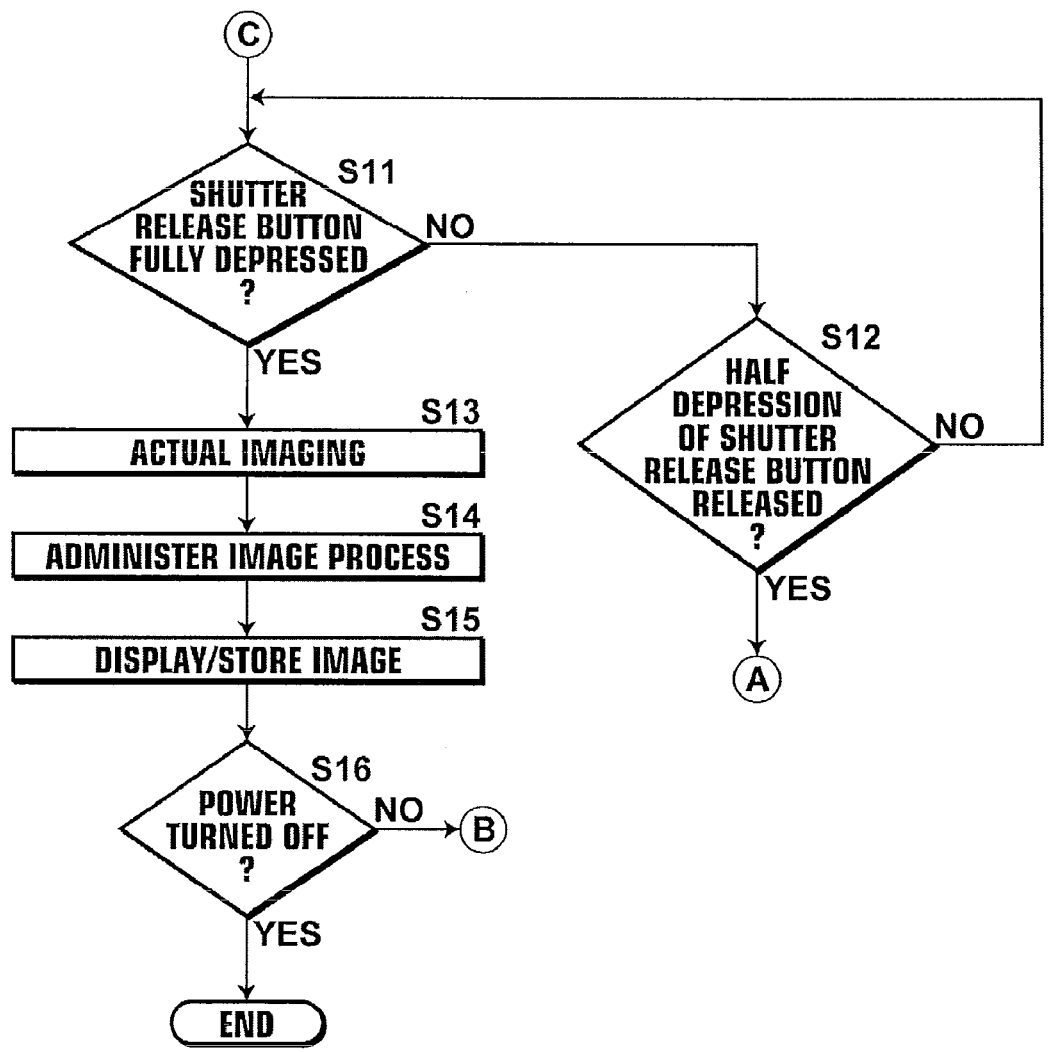
FIG. 5B is a second flow chart that illustrate the steps of an imaging process executed by the digital camera of the second embodiment.

An imaging process executed by the digital camera 1-2 having the above construction will be described. FIG. 5A and FIG. 5B are flow charts that illustrate the steps of the imaging process executed by the digital camera 1-2. Note that the steps of the process in FIGS. 5A and 5B which are the same as those illustrated in FIGS. 2A and 2B are denoted with the same step numbers, and descriptions thereof will be omitted. Detailed descriptions will only be given regarding the steps that differ between the two imaging processes.

As illustrated in FIG. 5A, after the dynamic range determining section 48 determines the dynamic range value at step S5, the imaging sensitivity determining section 52 of the digital camera 1-2 determines the imaging sensitivity as described above (step S20).

Then, the judging section 49 judges whether flash is to be emitted, based on the photometric results of the subject obtained by the AE processing section 33 (step S6). In the case that the judging section 49 judges that flash is not to be emitted (step S6: NO), the CPU 30 judges whether the imaging sensitivity value determined by the imaging sensitivity determining section 52 is less than a predetermined value A (step S21).

In the case that the CPU 30 judges that the imaging sensitivity value is less than the predetermined value A (step S21: YES), the imaging method selecting section 50 selects the first imaging method (step S22). Thereafter, the CPU 30 that functions as a control means sets the driving method of the CCD 13 according to the first imaging method at the CCD driving section 23, the timing generator, and the analog signal processing section 14, that is, the AFE (Analog Front End), and sets the image signal processing method according to the first imaging method at the image signal processing section 41 (step S23).

On the other hand, if the CPU 30 judges that the imaging sensitivity value is greater than or equal to the predetermined value A (step S21: NO), the imaging method selecting section 50 selects the second imaging method (step S24). Thereafter, the CPU 30 that functions as a control means sets the driving method of the CCD 13 according to the second imaging method at the CCD driving section 23, the timing generator, and the analog signal processing section 14, that is, the AFE (Analog Front End), and sets the image signal processing method according to the second imaging method at the image signal processing section 41 (step S25).

By selecting the first imaging method when the value of the imaging sensitivity is low, the limitation of the second imaging method, that dynamic range cannot be expanded at low sensitivities, can be compensated for.

Figure 6A:
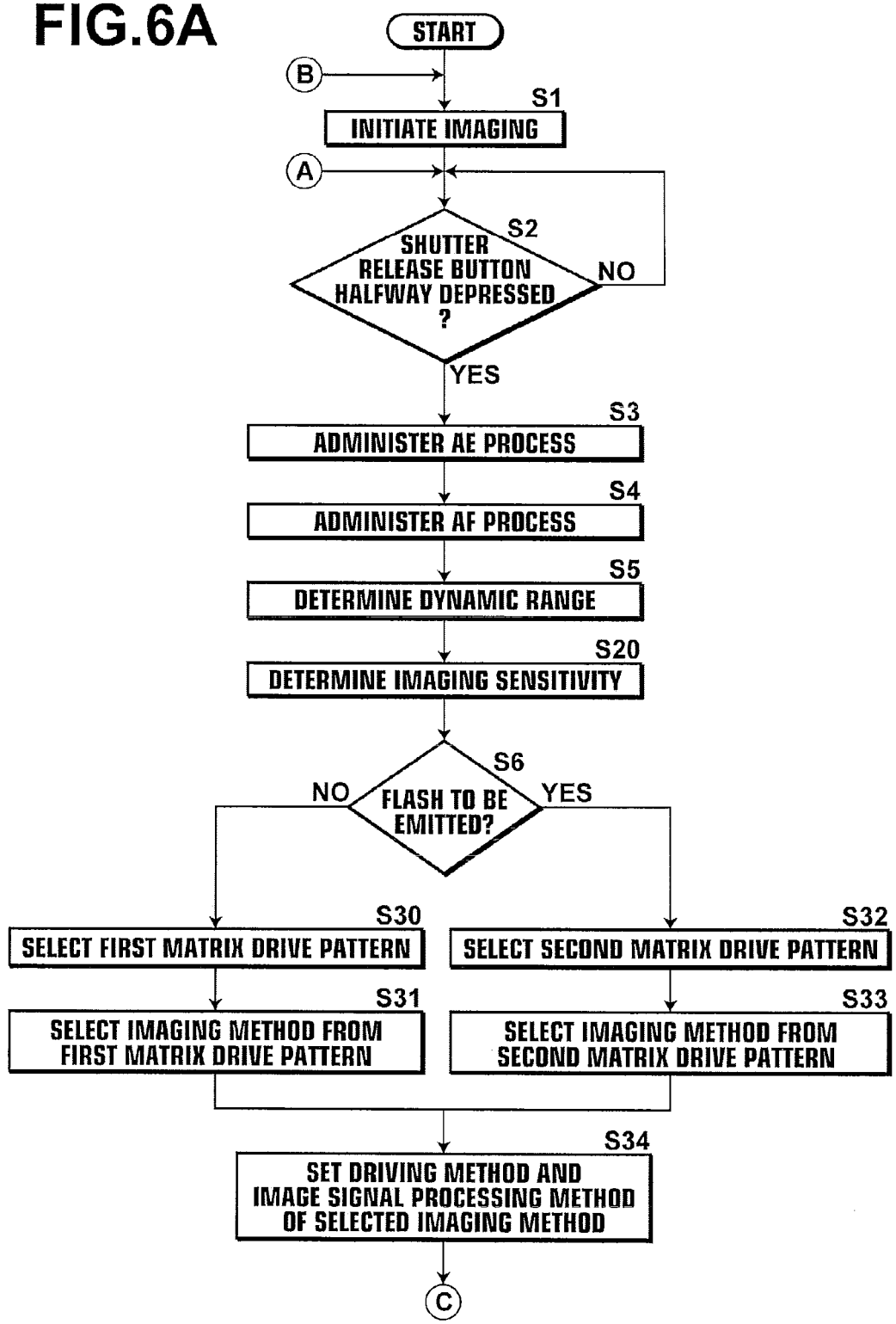
FIG. 6A is a first flow chart that illustrates the steps of an imaging process executed by a digital camera according to a third embodiment of the present invention.
Figure 6B:
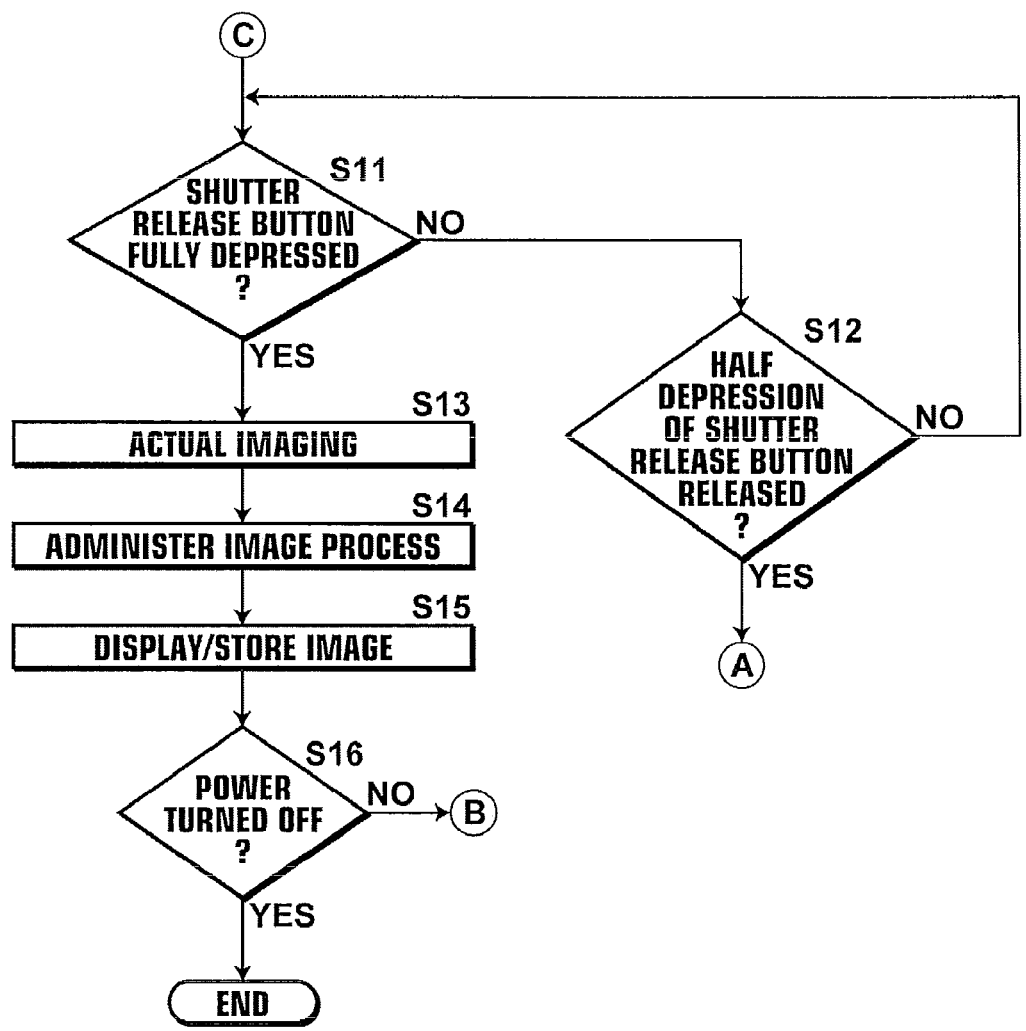
FIG. 6B is a second flow chart that illustrate the steps of an imaging process executed by the digital camera of the third embodiment.

Next, a digital camera 1-3 according to a third embodiment of the present invention will be described in detail with reference to the following drawings. Because the configuration of the digital camera 1-3 of the third embodiment is substantially the same as that of the digital camera 1-2 of the second embodiment, no drawing is provided, and detailed descriptions will be given only with regard to the components of the digital camera 1-3 that differ from those of the digital camera 1-2. FIG. 6A and FIG. 6B are flow charts that illustrate the steps of the imaging process executed by the digital camera 1-3. FIG. 7 illustrates examples of matrix drive patterns. Note that the steps of the process in FIGS. 6A and 6B which are the same as those illustrated in FIGS. 2A and 2B are denoted with the same step numbers, and descriptions thereof will be omitted. Detailed descriptions will only be given regarding the steps that differ between the two imaging processes.

The imaging method selecting section 50 of the digital camera 1-3 of the third embodiment selects a drive pattern from between: a first matrix drive pattern that includes the first imaging method that prioritizes dynamic range, an imaging method that prioritizes resolution, an imaging method that prioritizes resolution, and an imaging method that prioritizes sensitivity, each of which is set in advance for each imaging sensitivity value and each dynamic range value; and a second matrix drive pattern that includes the second imaging method that prioritizes dynamic range, an imaging method that prioritizes resolution, and an imaging method that prioritizes sensitivity, each of which is set in advance for each imaging sensitivity value and each dynamic range value. Further, the imaging method selecting section 50 selects an imaging method from among the plurality of imaging methods included in the selected matrix drive pattern, based on the dynamic range value determined by the dynamic range determining section 48 and the imaging sensitivity value determined by the imaging sensitivity determining section 52.

The first imaging method and the second imaging method that prioritize dynamic range are the same imaging methods as the first imaging method and the second imaging method that were described previously. In the imaging methods that prioritize resolution the CCD driving section 23 drives the CCD 13 such that the exposure times of the first light receiving elements and the second light receiving elements are equal. The image signal processing section 41 is driven such that it does not combine the outputs of the main pixels corresponding to the first light receiving elements and the sub pixels corresponding to the second light receiving element. Instead, the image signal processing section 41 treats the outputs of each of the first light receiving elements and the second light receiving elements as a single pixel. Signals output by all of the pixels, that is, full pixels, are utilized, to secure a great number of pixels for generating a single image data set.

In the imaging methods that prioritize sensitivity, the CCD driving section 23 drives the CCD 13 such that the exposure times of the first light receiving elements and the second light receiving elements are equal. The image signal processing section 41 is driven such that the outputs of the main pixels corresponding to the first light receiving elements and the sub pixels corresponding to the second light receiving element are added to generate combined output signals. The combined signals are utilized to generate an image data set having half the number of pixels. The added output signals have twice the outputs of the signals output by only the main pixels or the signals output by only the sub pixels. Therefore, the sensitivity is twice that of a full pixel image.

Note that in the present embodiment, the image signal processing section 41 performs the process to combine the signals after they are output from the main pixels and the sub pixels. Alternatively, the signals may be combined during readout from the CCD 13, and read out as combined signals.

The matrix drive patterns that include the plurality of imaging methods are set in the camera main body in advance, and are recorded in the internal memory 42, for example. As illustrated in FIG. 7, in matrix drive pattern 1, resolution prioritizing drive modes are selectable in cases in which the dynamic range D is within a range from D1 to D2 (D1<D≦D2) and the sensitivity A is within a range from A1 to A4 (A1<A≦A4), sensitivity prioritizing modes are selectable in cases in which the dynamic range D is within a range from D1 to D2 (D1<D≦D2) and the sensitivity A is within a range from A4 to A5 (A4<A≦A5), and dynamic range prioritizing drive modes are selectable in cases in which the dynamic range D is within a range from D2 to D4 (D2<D≦D4) and the sensitivity A is with a range from A1 to A5 (A1<A≦A5).

Meanwhile, as illustrated in FIG. 7, in matrix drive pattern 2, resolution prioritizing drive modes are selectable in cases in which the dynamic range D is within a range from D1 to D2 (D1<D≦D2) and the sensitivity A is within a range from A1 to A4 (A1<A≦A4), sensitivity prioritizing modes are selectable in cases in which the dynamic range D is within a range from D1 to D2 (D1<D≦D2) and the sensitivity A is within a range from A4 to A5 (A4<A≦A5), and dynamic range prioritizing drive modes are selectable in cases in which the dynamic range D is within a range from D2 to D3 (D2<D≦D3) and the sensitivity A is with a range from A2 to A5 (A2<A≦A5) and in cases in which the dynamic range D is within a range from D3 to D4 (D3<D≦D4) and the sensitivity A is with a range from A3 to A5 (A3<A≦A5).

Because the second imaging method cannot expand dynamic range at low sensitivities, the second imaging method that prioritizes dynamic range is not selectable at low sensitivities, as illustrated in FIG. 7. Note that the matrix drive patterns may be changed as appropriate.

Note that D1, D2, D3, and D4 and A1, A2, A3, A4, and A5 satisfy the conditions of D1<D2<D3<D4 and A1<A2<A3<A4<A5.

An imaging process executed by the digital camera 1-3 having the above construction will be described. As illustrated in FIG. 6A, the judging section 49 judges whether flash is to be emitted, based on the photometric results of the subject obtained by the AE processing section 33 (step S6). In the case that the judging section 49 judges that flash is not to be emitted (step S6: NO), the imaging method selecting section 50 selects matrix drive pattern 1 (step S30), then selects an imaging method from within the matrix drive pattern 1 (step S31).

The imaging method is selected by applying the dynamic range value determined by the dynamic range determining section 48 and the imaging sensitivity value determined by the imaging sensitivity determining section 52 to matrix pattern 1 illustrated in FIG. 7.

On the other hand, in the case that the judging section 49 judges that flash is to be emitted (step S6: YES), the imaging method selecting section 50 selects matrix drive pattern 2 (step S32), then selects an imaging method from within the matrix drive pattern 2 (step S33).

The imaging method is selected by applying the dynamic range value determined by the dynamic range determining section 48 and the imaging sensitivity value determined by the imaging sensitivity determining section 52 to matrix pattern 2 illustrated in FIG. 7.

At this time, in the case that the determined dynamic range value and the imaging sensitivity value fall within a range within matrix pattern 2 of FIG. 7 at which an imaging method is not selectable, that is, in the case that the dynamic range is within a range from D2 to D3 (D$2<$D$\leqq$D$3$) and the sensitivity A is within a range from A1 to A2 (A$1<$A$\leqq$A$2$) or the dynamic range is within a range from D3 to D4 (D$3<$D$\leqq$D$4$) and the sensitivity A is within a range from A1 to A3 (A$1<$A$\leqq$A$3$), the dynamic range determining section 48 and the imaging sensitivity determining section 52 reset the dynamic range value and the image sensitivity value to those within the matrix drive pattern 2 at which an imaging method is selectable, based on photometric data obtained by the AE processing means 33 and set exposure values, such as aperture values and exposure times (shutter speeds). Then, the imaging method is selected again, by applying the reset dynamic range value and the reset imaging sensitivity value to matrix pattern 2 illustrated in FIG. 7.

After the imaging method selecting section 50 selects an imaging method (step S31), the CPU 30 that functions as a control means sets the driving method of the CCD 13 according to the selected imaging method at the CCD driving section 23, the timing generator, and the analog signal processing section 14, that is, the AFE (Analog Front End), and sets the image signal processing method according to the selected imaging method at the image signal processing section 41 (step S34).

According to the digital camera 1-3 of the third embodiment, the limitations with respect to dynamic range expansion due to flash emission can be reduced in the same manner as the digital cameras 1 and 1-2 of the first and second embodiments. In addition, an optimal imaging method can be selected according to imaging conditions such as an imaging sensitivity value and a dynamic range value.

Note that the imaging apparatus of the present invention is not limited to the digital camera of the embodiments described above. Various changes and modifications are possible, as long as they do not stray from the spirit and scope of the present invention.

What is claimed is:

1. An imaging apparatus, comprising:
   an imaging element constituted by a great number of first light receiving elements and second light receiving elements that photoelectrically convert light from subjects, which are capable of being controlled so as to be driven independently from each other and are arranged in a predetermined arrangement;
   imaging means, for independently controlling the first light receiving elements and the second light receiving elements to drive the imaging element;
   image signal processing means, for obtaining image signals based on the output of at least one of the first light receiving elements and the second light receiving elements and for generating image data from the image signals;
   photometry means, for measuring the photometric values of the subjects;
   imaging condition determining means, for determining imaging conditions including exposure and dynamic range values, based on the results of measurement of the photometric values by the photometry means;
   judging means, for judging whether flash is to be emitted toward the subjects, based on the results of measurement of the photometric values by the photometry means;
   imaging method selecting means, for selecting a first imaging method, in which the imaging means performs imaging with different exposures for the first light receiving elements and the second light receiving elements and the image signal processing means processes image signals formed based on the outputs of the first light receiving elements and the second light receiving elements that have performed imaging with different exposures to obtain image data in the case that the judging means judges not to emit flash toward the subjects, and a second imaging method, in which the imaging means performs imaging with the first light receiving elements and the second light receiving elements at the same exposure time at an underexposure at a step number based on the determined value of the dynamic range and the image signal processing means administers gradation correcting processes on image signals formed based on the outputs of the first light receiving elements and the second light receiving elements that perform underexposure imaging to obtain image data, in the case that the judging means judges to emit flash toward the subjects; and
   control means, for driving the imaging element and the image signal processing means according to the imaging method selected by the imaging method selecting means.

2. An imaging apparatus as defined in claim 1, wherein:
   the imaging conditions include the imaging sensitivity of the imaging element;
   the imaging method selecting means selects the first imaging method in the case that the judging means judges that flash is not to be emitted and the imaging sensitivity is less than a predetermined threshold value; and
   the imaging method selecting means selects the second imaging method in the case that the judging means judges that flash is not to be emitted and the imaging sensitivity is greater than or equal to the predetermined threshold value.

3. An imaging apparatus as defined in claim 1, wherein:
   the imaging conditions include the imaging sensitivity of the imaging element;
   the imaging method selecting means selects a drive pattern from between: a first matrix drive pattern that includes the first imaging method that prioritizes dynamic range, an imaging method that prioritizes resolution, and an imaging method that prioritizes sensitivity, each of which is set in advance for each imaging sensitivity value and each dynamic range value; and a second matrix drive pattern that includes the second imaging method that prioritizes dynamic range, an imaging method that prioritizes resolution, and an imaging method that prioritizes sensitivity, each of which is set in advance for each imaging sensitivity value and each dynamic range value;

the imaging method selecting means selects the first matrix drive pattern when the judging means judges that flash is not to be emitted and selects the second matrix drive pattern when the judging means judges that flash is to be emitted, and then selects an imaging method from among the plurality of imaging methods which are included in the selected matrix drive pattern, based on the imaging sensitivity and the dynamic range value determined by the imaging condition determining means.

4. An imaging method that utilizes an imaging apparatus equipped with an imaging element constituted by a great number of first light receiving elements and second light receiving elements that photoelectrically convert light from subjects, which are capable of being controlled so as to be driven independently from each other and are arranged in a predetermined arrangement, comprising the steps of:

measuring photometric values of the subjects;

determining imaging conditions including exposure and dynamic range values, based on the results of measurement of the photometric values;

judging whether flash is to be emitted toward the subjects, based on the results of measurement of the photometric values;

selecting a first imaging method, in which the imaging element performs imaging with different exposures for the first light receiving elements and the second light receiving elements and image signal processing means processes image signals formed based on the outputs of the first light receiving elements and the second light receiving elements that have performed imaging with different exposures to obtain image data in the case that judging means judges not to emit flash toward the subjects;

selecting a second imaging method, in which the imaging element performs imaging with the first light receiving elements and the second light receiving elements at the same exposure time at an underexposure at a step number based on the determined value of the dynamic range and the image signal processing means administers gradation correcting processes on image signals formed based on the outputs of the first light receiving elements and the second light receiving elements that perform underexposure imaging to obtain image data, in the case that the judging means judges to emit flash toward the subjects; and driving the imaging element and processing image signals according to the imaging method selected.

5. An imaging method as defined in claim 4, wherein:

the imaging conditions include the imaging sensitivity of the imaging element;

the first imaging method is selected in the case that the judging means judges that flash is not to be emitted and the imaging sensitivity is less than a predetermined threshold value; and the second imaging method is selected in the case that the judging means judges that flash is not to be emitted and the imaging sensitivity is greater than or equal to the predetermined threshold value.

6. An imaging method as defined in claim 4, wherein:

the imaging conditions include the imaging sensitivity of the imaging element;

a first matrix drive pattern that includes the first imaging method that prioritizes dynamic range, an imaging method that prioritizes resolution, and an imaging method that prioritizes sensitivity; and a second matrix drive pattern that includes the second imaging method that prioritizes dynamic range, an imaging method that prioritizes resolution, and an imaging method that prioritizes sensitivity; are set in advance for each imaging sensitivity value and each dynamic range value;

the first matrix drive pattern is selected when the judging means judges that flash is not to be emitted and the second matrix drive pattern is selected when the judging means judges that flash is to be emitted; and an imaging method is selected from among the plurality of imaging methods which are included in the selected matrix drive pattern, based on the determined imaging sensitivity and the dynamic range value.

* * * * *